April 30, 1929.  A. D. ROBBINS  1,711,128
DUAL REAR AXLE DRIVE
Filed Nov. 19, 1923  3 Sheets-Sheet 1
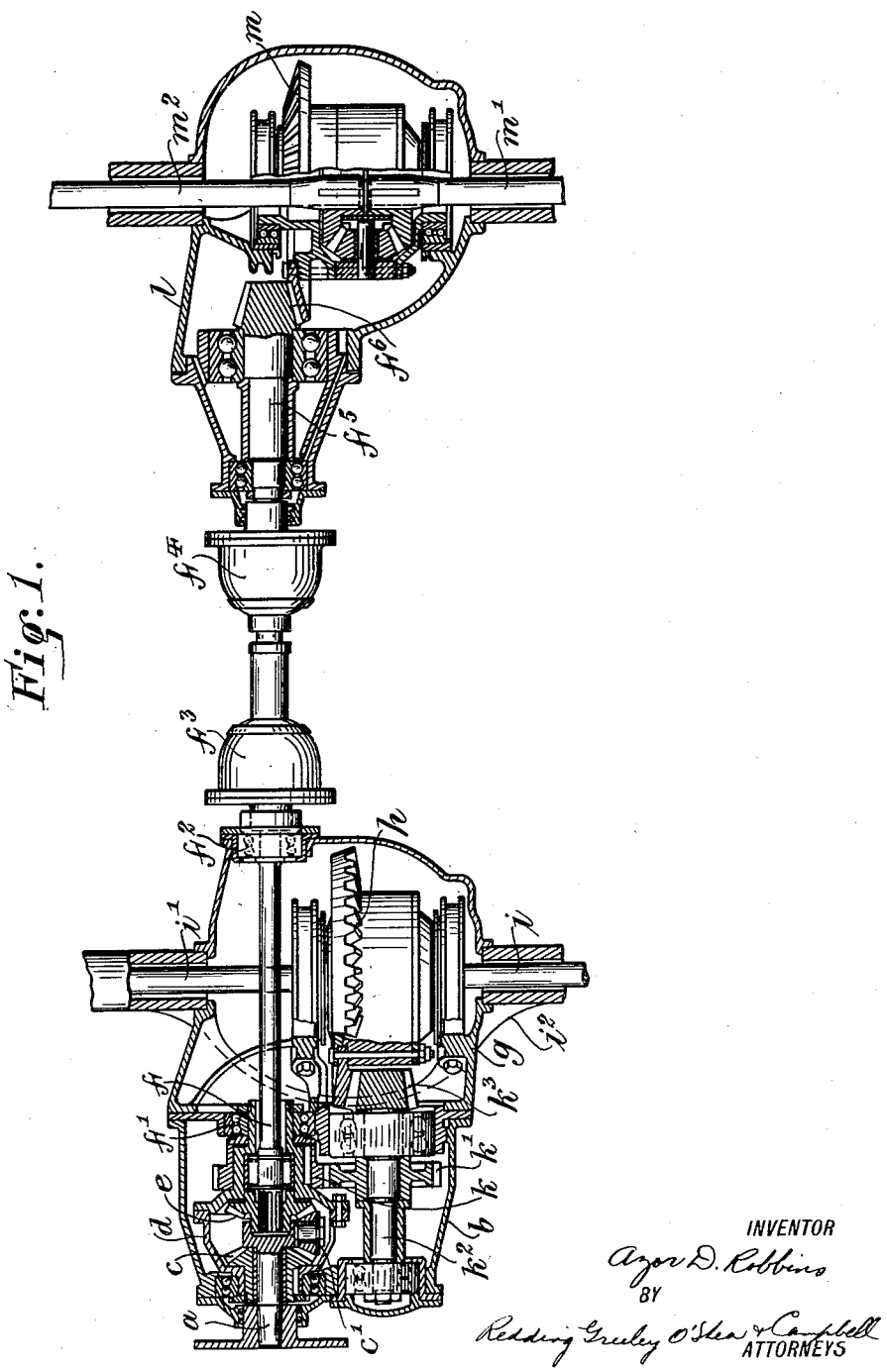

April 30, 1929.  A. D. ROBBINS  1,711,128
DUAL REAR AXLE DRIVE
Filed Nov. 19, 1923   3 Sheets-Sheet 2
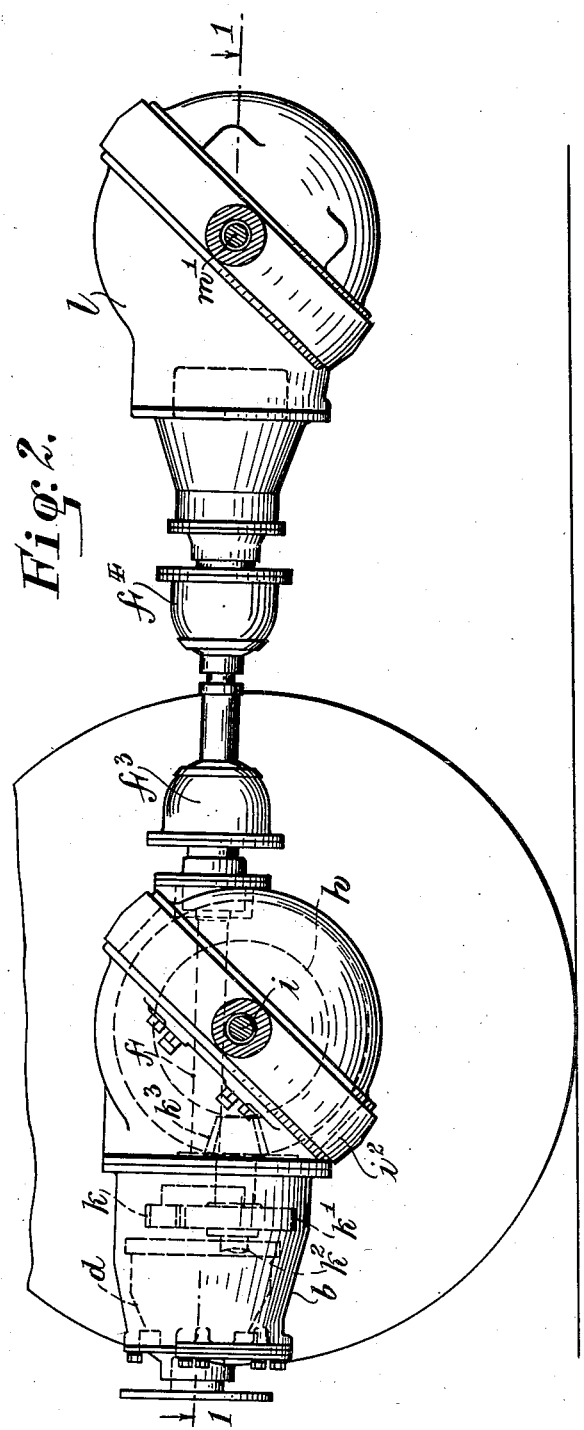
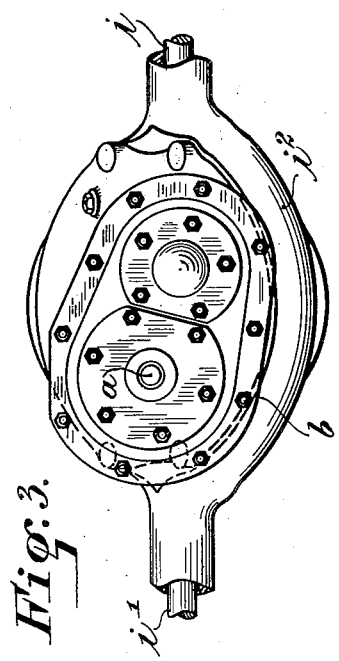
INVENTOR
Azor D. Robbins
BY
Redding Greeley O'Shea & Campbell
ATTORNEYS

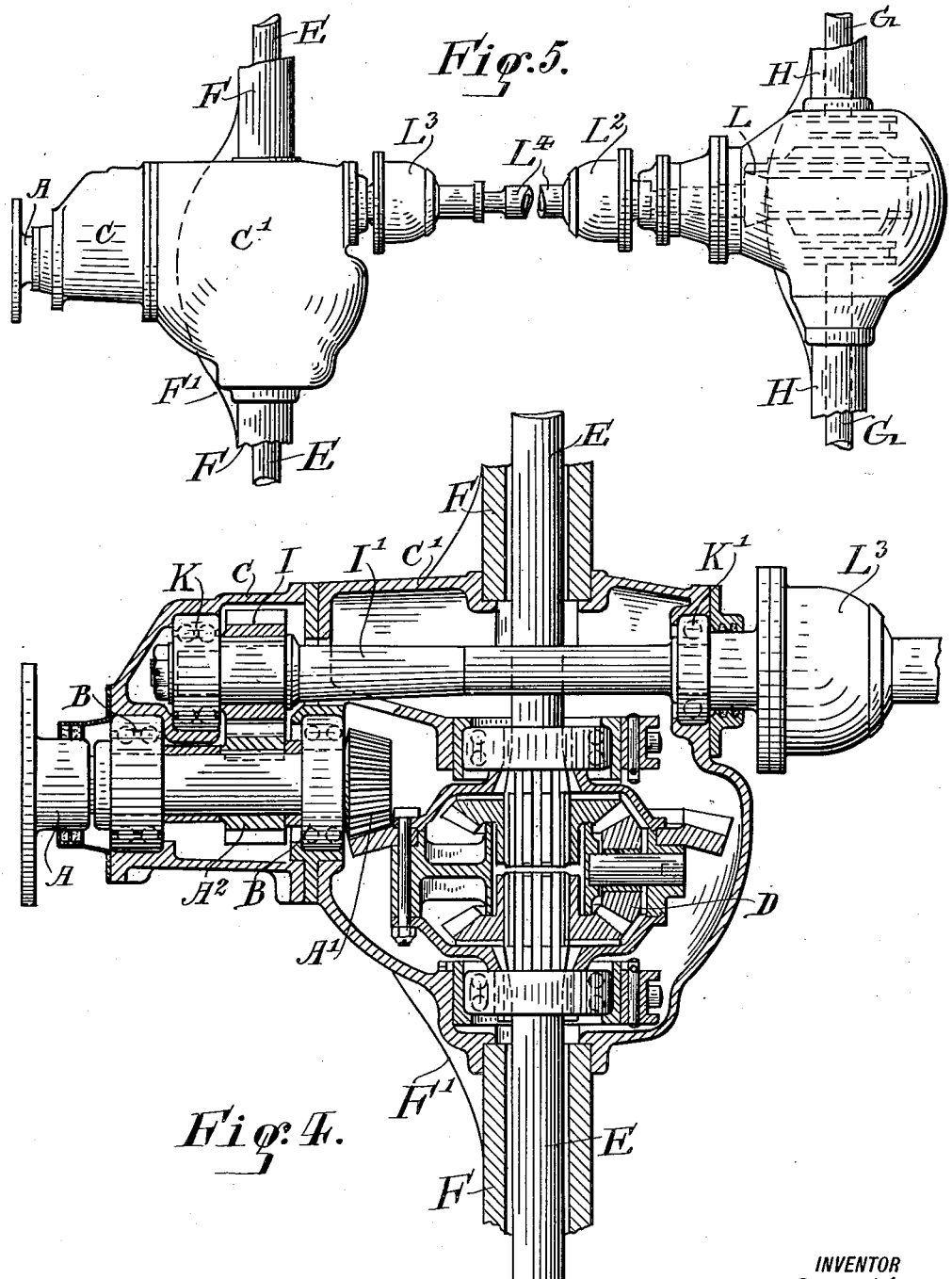

Patented Apr. 30, 1929.

1,711,128

UNITED STATES PATENT OFFICE.

AZOR D. ROBBINS, OF NEW YORK, N. Y., ASSIGNOR TO INTERNATIONAL MOTOR COMPANY, OF NEW YORK, N. Y., A CORPORATION OF DELAWARE.

DUAL-REAR-AXLE DRIVE.

Application filed November 19, 1923. Serial No. 675,446.

This invention relates to certain improvements in dual rear axle drives and is concerned more particularly with the relation of parts by which desirable conditions of motor practice may be satisfied, than with the particular character of the driving elements per se. Where dual rear axles are employed for motor vehicles it is important practically that certain alignments be approximated of the power transmission elements for the two axles and that, nevertheless, the axles themselves be disposed with the usual ground clearance and at the usual height for support of the springs. The problem of maintaining the most advantageous relationship in conformity with the best practice is difficult where, as is desirable, the power is divided at one axle and part of it led through additional shafting to the other axle. In accordance with the present invention it is proposed to provide the power for a dual rear axle drive and transmit it from one axle to another through elements and shafting which are so disposed as not to disturb the most desirable relationship of the axles and associated parts. More particularly, the invention is concerned with the application of the improvements to dual rear axles of the banjo type. The advantages and results herein referred to are attained, generally speaking, by dividing the power through gear elements disposed within a part of the housing for the differential gear of one of the axles, transmitting part of the power through a shaft which is journaled directly in said housing and interposing between said last named shaft and the other axle suitable devices such as universal joints, if necessary, to provide for the desirable clearances with respect to the axle shafts themselves. The invention will be described with greater particularity in connection with the accompanying drawings, wherein:

Figure 1 is a view partly in horizontal section and partly in plan showing the differential gears and housings for two dual rear axles and the power transmitting shaft therebetween, differential movement as between the two rear axles being provided for by a third differential gear at the point of division of the power.

Figure 2 is a view in side elevation showing the relation maintained between two dual rear axles with the power transmitting shafting extending therebetween.

Figure 3 is a view in front elevation of the foremost axle.

Figure 4 is a view partly in horizontal section and partly in plan showing the foremost dual axle of a pair but in which the power from the propeller shaft is divided without the interposition of an additional differential gear such as is shown in Figure 1.

Figure 5 is a view in plan thereof.

As indicated hereinbefore, this invention is concerned less with the nature of the elements for driving dual rear axles than with the disposition of the elements for providing the power and transmitting part thereof from one axle to another. Figure 1, however, shows suitable parts for receiving and dividing power for dual rear axles. The propelling shaft section $a$ which is journaled in the housing $b$ has journaled thereon a pinion $c$ on the hub of which is keyed a revoluble housing $d$. Planetary differential pinions $c'$ carried with the end of the shaft $a$ engage the gear $c$ and also mesh with a bevel gear $e$ keyed on a shaft section $f$ which extends rearwardly through the housing $g$ for the differential gear $h$ of the shaft sections $i, i'$, of one of the dual rear axles. Bearings $f', f^2$, in the housing $g$ support the shaft section $f$. The revoluble casing $d$ heretofore referred to has keyed thereon a spur gear $k$ which meshes with a reduction spur gear $k'$ carried on a short shaft section $k^2$ journaled in the casing $b$ and having on its end a final drive pinion $k^3$ which meshes with the ring gear of the differential gearing $h$. In the manner described power from the propelling shaft section $a$ is divided through the differential gearing $c, c', e$, in such manner that differential action as between the shaft section $f$ and the shaft sections $i, i'$, considered as a unit, is afforded. The shaft section $f$ extends through the banjo portion $i^2$ of the foremost dual rear axle and is disposed immediately above the shaft section $i'$ thereof, so that compactness is assured while at the same time minimum clearances are retained. By the arrangement described the shaft section $f$ is maintained in prolongation of the propelling shaft section $a$ while the power taken off to drive the ring gear of the differential gearing $h$ is taken off through the shaft section $k^2$ which is disposed parallel to and only a little below the shaft section $f$ in a plane passing through the axes of the axle sections $i, i'$ thereby insuring that the power is taken rearwardly to the driven shaft sections with maximum efficiency. The shaft section $f$ is coupled through universal joints $f^3$, $f^4$, with a shaft section $f^5$ journaled within the housing $l$ of the rearmost dual axle. The final drive pinion $f^6$ on the shaft section $f^5$ engages the differential gear $m$ for the axle sections $m'$, $m^2$, of the rearmost dual axle.

Briefly stated, the shaft $f$ is parallel with the shaft $k^2$ but somewhat above the plane passing through the axis of the last named shaft. The axis of the shaft $f$ is substantially in the same line as the axis of the short shaft section and in a plane passing through the axes of the axle sections $m'$, $m^2$, but inclined somewhat so as to allow the shaft $f$ to clear the axle section $i'$, while the shaft $k^2$ is disposed substantially in a plane passing through the axis of the shaft sections $i'$, $i''$.

The construction described insures a maintenance of the most desirable relationship in the final drive elements of the two axles and in the axles themselves, as dictated by the best motor vehicle practice. At the same time, maximum power efficiency in transmission is insured. Other gear arrangements for splitting the power at one of the axles may be employed without departing from the spirit of the invention as may other details of design falling within the skill of a mechanic.

What I claim is:

1. In combination, two pairs of live axle sections spaced apart, a rearwardly extending propeller shaft driving the foremost pair, a drive for the foremost pair connected to the propeller shaft, a shaft coaxial with the propeller shaft and extending at one side of the drive of the foremost pair to drive the rearmost pair and having its axis passing through the axes of the rear axle sections, and driving means operatively interposed between the propeller shaft and the said coaxial shaft.

2. In a motor vehicle having two pairs of live axles, final drive ring gears associated with each pair, a plurality of short shaft sections, each section being provided with gears at one end thereof, the axes of the sections lying in planes through the axes of the live axles, the gears carried by the sections meshing respectively with said final drive gears, a shaft driven from a power source, means carried with one of said pairs of live axles and driven from the last named power shaft for apportioning power to the short shaft sections and means connecting the apportioning means with the distant short shaft, said means being offset with respect to the short shaft driving the axle sections carrying the apportioning means and being axially in alignment with the shaft driven from the power source.

3. In a motor vehicle having two pairs of live axles, differential gearing for each pair, differential driving pinions, final drive ring gears operatively connected with the differential driving pinions, short shaft sections carrying gears, the axes of the sections being respectively in planes through the axes of the live axles, the gears meshing respectively with said final drive ring gears and encased in housings unitary with the differential housings, power differential gearing to differentiate between the two pairs of live axles and encased in a housing unitary with the differential axle housing of the foremost of the said pair of axles, means operatively connecting the last named differential gearing with the two short shaft sections including a power shaft transmitting power to the rearmost of the pair of live axles and being offset with respect to the differential of the front pair of axles and parallel to the foremost of said short shaft sections and coaxial with the rearmost short shaft section, said power shaft passing through the differential axle housing of the foremost of the pair of dual rear axles and being inclined to clear the axle over which it passes, and a shaft section connected by a universal joint to the power shaft transmitting power to the rearmost axle and by another universal joint to the short shaft section driving the final drive gear of the rearmost axle sections, such shaft section being coaxial with the power shaft transmitting power to the rearmost of the pair of dual axles and with the short shaft section of the rearmost of the pair of dual rear axles.

This specification signed this 14th day of November, A. D. 1923.

AZOR D. ROBBINS.